United States Patent
Su

(10) Patent No.: US 8,100,339 B2
(45) Date of Patent: Jan. 24, 2012

(54) PREAMBLE DATA GENERATING METHOD AND RELATED APPARATUS FOR QUICK RESPONSE CODE

(75) Inventor: Chih-An Su, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 339 days.

(21) Appl. No.: 12/236,483

(22) Filed: Sep. 23, 2008

(65) Prior Publication Data

US 2009/0166439 A1 Jul. 2, 2009

(30) Foreign Application Priority Data

Dec. 28, 2007 (TW) .............................. 96150893 A

(51) Int. Cl.
*G06K 19/06* (2006.01)

(52) U.S. Cl. .................. 235/494; 235/462.07; 235/462.1

(58) Field of Classification Search .................... 235/494
See application file for complete search history.

(56) References Cited

U.S. PATENT DOCUMENTS

2005/0274804 A1* 12/2005 Matsumoto .............. 235/462.01

FOREIGN PATENT DOCUMENTS

TW 200740128 10/2007

* cited by examiner

*Primary Examiner* — Thien M. Le
*Assistant Examiner* — Christle Marshall
(74) *Attorney, Agent, or Firm* — Winston Hsu; Scott Margo

(57) ABSTRACT

In order to increase the preamble information capacity of the QR code and avoid decoding errors, a method of embedding preamble information into a standard quick response (QR) code symbol is provided to generate a first QR code symbol. The method includes generating a preamble pattern according to a user definable data; and embedding the preamble pattern into a standard position detection pattern of the standard QR code symbol to generate a first position detection pattern.

16 Claims, 6 Drawing Sheets

PREAMBLE DATA GENERATING METHOD AND RELATED APPARATUS FOR QUICK RESPONSE CODE

BACKGROUND OF THE INVENTION

1. Field of the Invention

The present invention relates to a data generating method and related apparatus, and more particularly to a data generating method and related apparatus for increasing preamble information capacity for a quick response code.

2. Description of the Prior Art

A quick response code, also known as QR code, is a two-dimensional barcode that offers high-speed and omni-directional reading and has a large information capacity and high reliability, and also is compatible with diverse characters and image information. With the abovementioned advantages, the QR code is therefore used in industrial management, electronic business and personal information exchanges and many other fields. A user can take a picture for the QR code with a digital camera and thereby retrieve embedded information of the QR code after the picture is identified and decoded by an interpreting software.

The QR code includes several properties. For example, the QR code can be embedded with Japanese characters, encoded by the Shift_JIS standard, or Chinese characters, encoded by the UTF-8 (traditional Chinese) or GB 2312 (Simplified Chinese) standard. The QR code has fifty symbol size versions from 21×21 modules (Version 1) to 217×217 modules (Version 50). The symbol with a higher-numbered version has greater information capacity. A black module represents "1" in binary, whereas a white module represents "0" in binary. The error correction of the QR code has four levels of L, M, Q and H, by which approximate 7%, 15%, 25% and 30% of codewords that can be restored, respectively. Taking a QR code of version 40 with level L for example, the QR code symbol has a maximum data capacity of 7,089 numeric characters, 4,296 alphanumeric characters, 2,953 8-bit characters and 1,817 Chinese/Kanji characters.

Please refer to FIG. 1, which is a schematic diagram of a QR code symbol 10 according to the prior art. For simplicity, the QR code 10 includes position detection patterns 12, 14 and 16, separators 18, 20 and 22, and an information area 24. During interpretation of the QR code symbol 10, the position detection patterns 12, 14 and 16 provide the symbol size and area, and the separators 18, 20 and 22 provide clear margins to separate the position detection patterns 12, 14 and 16 from the information area 24. The information area 24 includes diverse patterns and data, such as an alignment pattern, version and error correction information, and a pattern of embedded data. The detailed specification for the QR code can be referred by a data coding specification 18004 developed by International Organization for Standardization (ISO) and International Electrotechnical Commission (IEC) and therefore the detailed drawing and depiction of the information area 24 are omitted herein.

The specification 18004 does not provide uniform specification for character encoding, and the character encoding format chosen by preference in countries. For example, the Open Mobile Internet Alliance (OMIA) in Taiwan adopts the UTF-8 format, whereas the Shift_JIS format is used in Japan. When the formats for encoding and decoding are different, the decoding result of the QR code is correct if the data of the QR code is simply alphanumeric and numeric characters. However, the decoding result of the QR code becomes unidentifiable if the data of the QR code includes Chinese or Japanese characters. For example, a QR code symbol includes a traditional Chinese data content of "Hello Everybody" encoded based on the UTF-8 format, and the QR code symbol is stamped on a Taiwan product. If the product is shipped to Japan, the QR code of the product is decoded based on the Shift_JIS format so that a decoding result of the "Hello Everybody" becomes unreadable characters.

To solve the abovementioned decoding problem, the user has to obtain information of the encoding format in advance and mutually changes the decoding format used in a decoding apparatus. Thus, the QR code of the prior art results in inconvenience of decoding process for transnational products.

SUMMARY OF THE INVENTION

The present invention therefore provides a method and related apparatus of embedding preamble information into a standard QR code symbol to avoid decoding errors and to increase the preamble information capacity of the QR code.

The present invention discloses a method of embedding preamble information into a standard QR code symbol to generate a first QR code symbol. The method includes generating a preamble pattern according to a user definable data; and embedding the preamble pattern into a standard position detection pattern of the standard QR code symbol to generate a first position detection pattern.

The present invention further discloses a device for embedding preamble information into a standard QR code symbol to generate a first QR code symbol. The device includes a pattern generating unit and an embedding unit. The pattern generating unit is used for generating a preamble pattern according to a user definable data. The embedding unit is coupled to the pattern generating unit and used for embedding the preamble pattern into a standard position detection pattern of the standard QR code symbol to generate a first position detection pattern.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
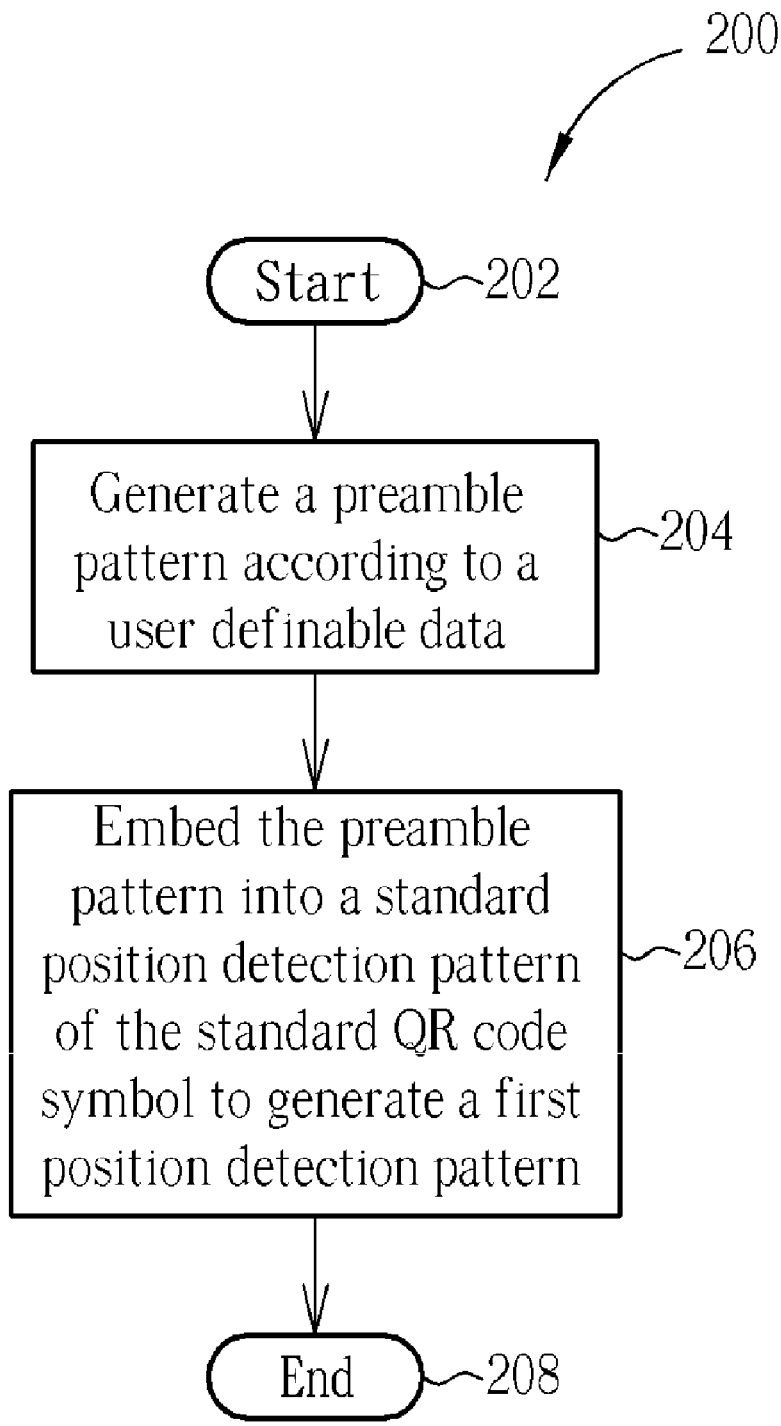
FIG. 2 is a schematic diagram of a preamble generating process according to an embodiment of the present invention.

Please refer to FIG. 2, which is a schematic diagram of a preamble generating process 200 according to an embodiment of the present invention. The preamble generating process 200 is utilized to embed preamble information into a standard QR code symbol to generate a first QR code symbol, where the standard QR code symbol conforms to the data coding specification 18004 developed by ISO and IEC and has the same symbol format as the QR code 10 of the prior art.

The preamble generating process 200 includes the following steps:

Step 202: Start.

Step 202: Generate a preamble pattern according to a user definable data.

Step 206: Embed the preamble pattern into a standard position detection pattern of the standard QR code symbol to generate a first position detection pattern.

Step 208: End.

In the preamble generating process 200, the user definable data may include country, character encoding and company information of the first QR code symbol, and thereby the preamble pattern is generated according to the user definable data. The preamble pattern is then embedded into the standard position detection pattern to generate the first position detection pattern. Preferably, the preamble pattern is adjusted in size or color to conform to the data coding specification 18004 before being embedded. In addition, the first QR code symbol is generated by replacing the standard position detection pattern of the standard QR code symbol with the first position detection pattern. In other words, the only difference between the first and standard QR code symbol is at the position detection pattern area. In this situation, a receiver for interpreting the first QR code symbol can automatically obtain the character encoding information from the preamble pattern to avoid unreadable decoding results. Furthermore, the receiver can know the country and company information of a product stamped with the first QR code symbol, thereby simplifying the industrial and business managing processes.

Figure 1:
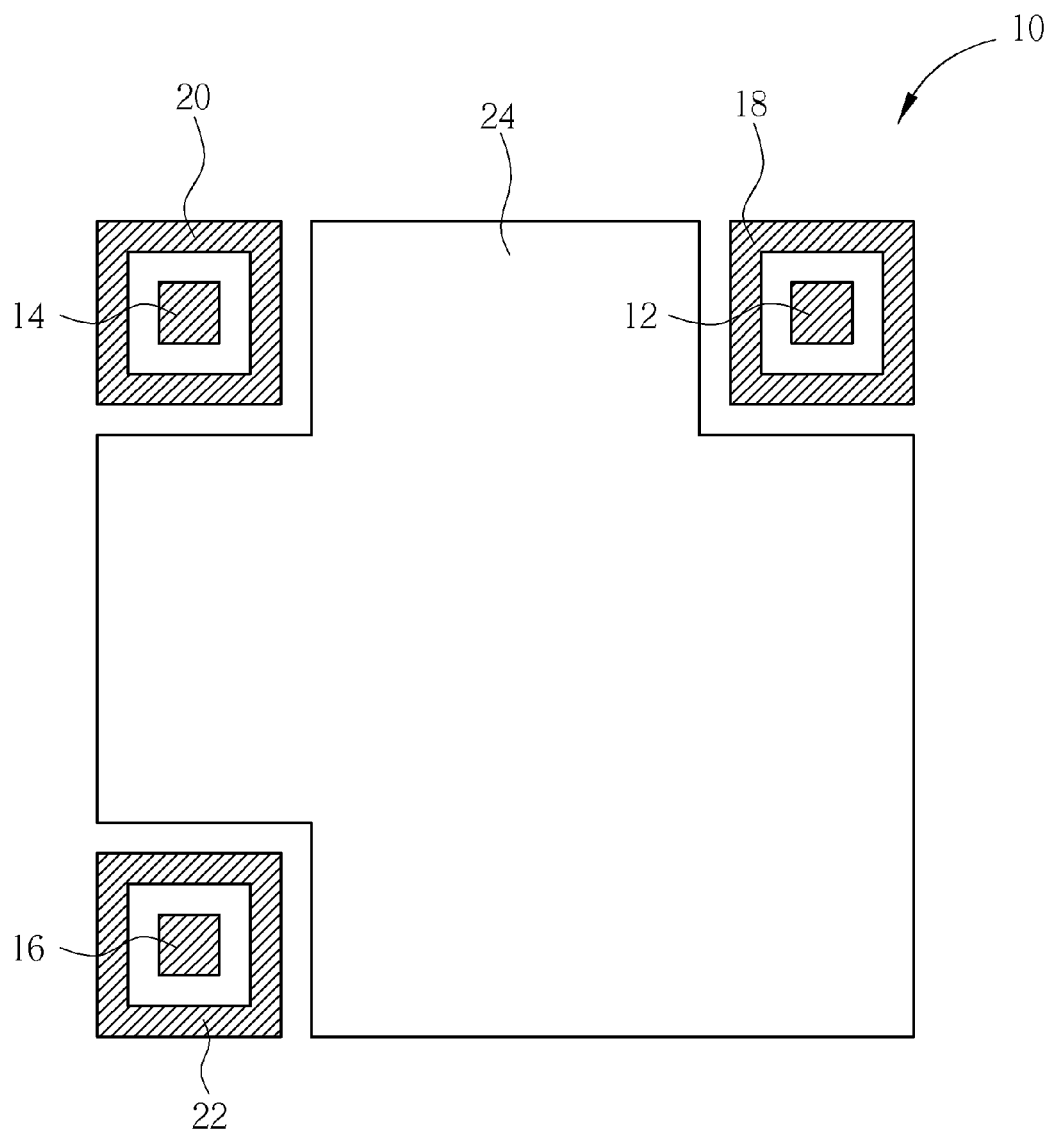
FIG. 1 is a schematic diagram of a QR code symbol according to the prior art.
Figure 3:
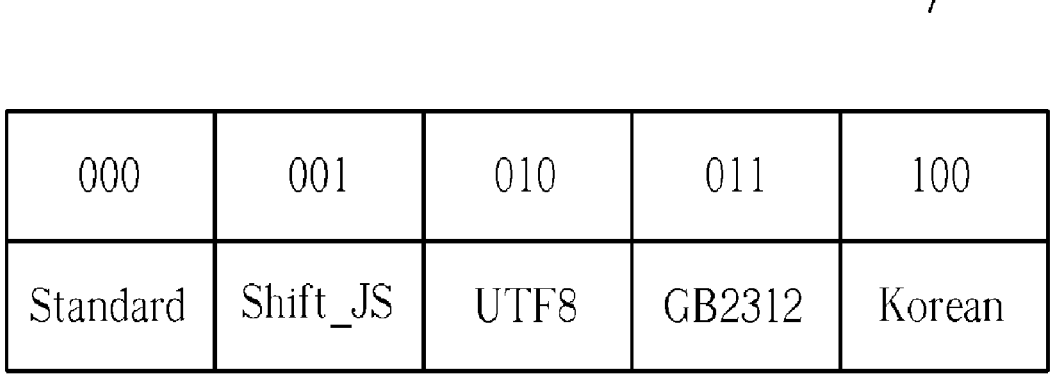
FIG. 3 is a data content of a user definable data according to an embodiment of the present invention.
Figure 4:
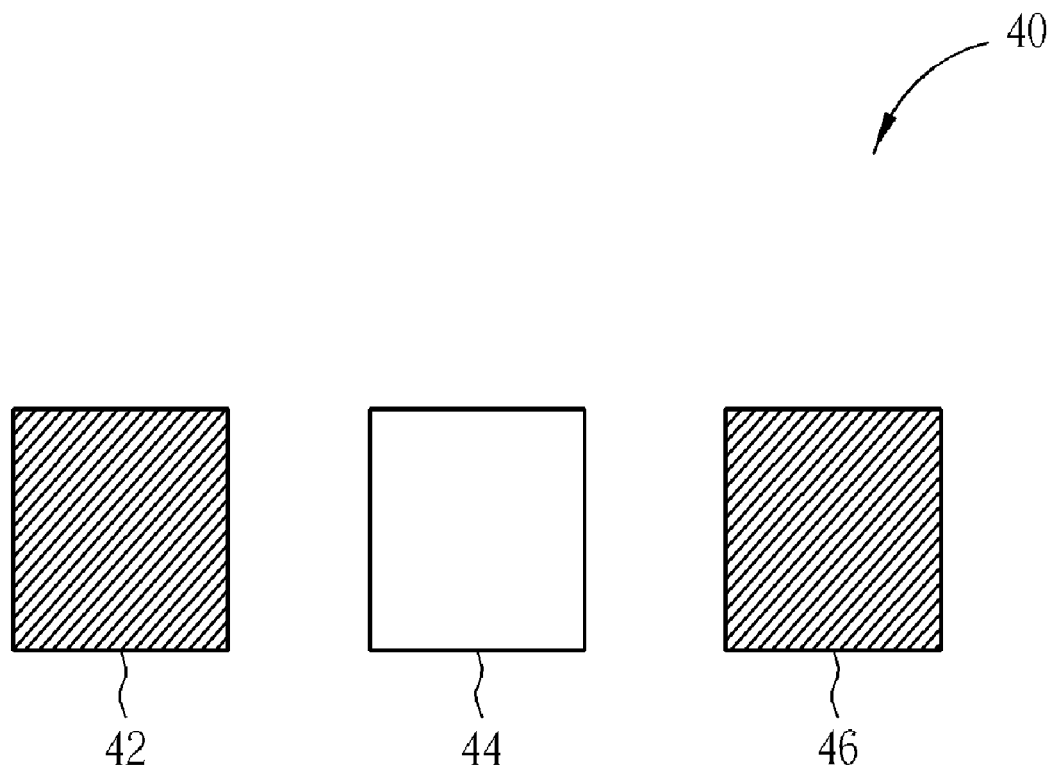
FIG. 4 is a preamble pattern according to an embodiment of the present invention.
Figure 5:
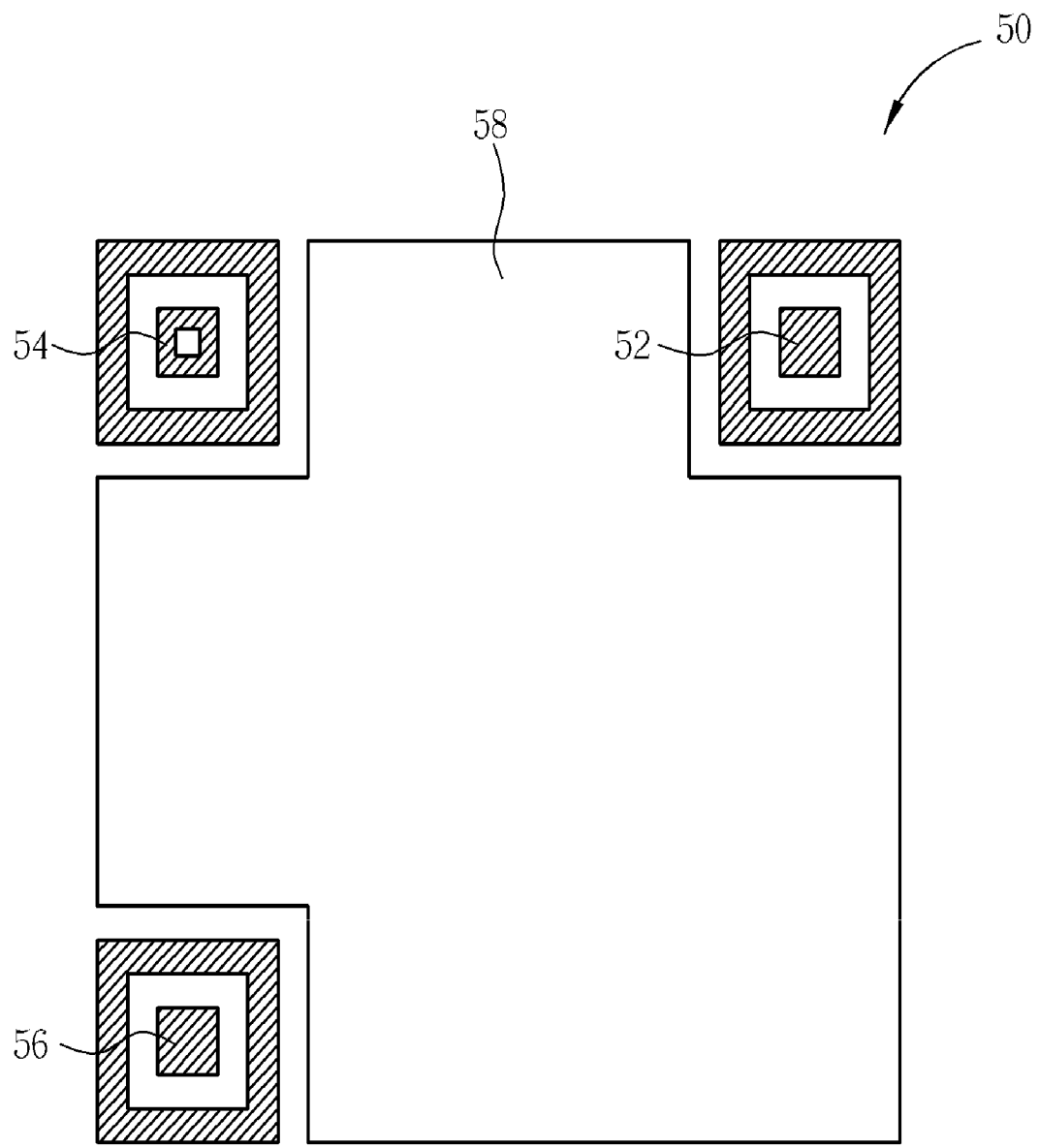
FIG. 5 is a first QR code symbol according to an embodiment of the present invention.

Please refer to FIGS. 3-5. FIG. 3 depicts data content of a user definable data 30 according to an embodiment of the present invention; FIG. 4 depicts a preamble pattern 40 according to an embodiment of the present invention; FIG. 5 depicts a first QR code symbol 50 according to an embodiment of the present invention. The user definable data 30 may be a look-up table including entries of Shift_JIS (for Japanese), UTF-8 (for traditional Chinese) and GB 2312 (for simplified Chinese) corresponding to code symbols of "001", "010", "011" and "100", respectively. Assuming that the first QR code symbol 50 adopts the UTF-8 format for data encoding, the preamble pattern 40 is generated based on the "010" codeword. As shown in FIG. 4, character modules 42, 44 and 46 respectively correspond to codewords of "0", "1" and "0". That is, the "0" codeword represents a black character module, whereas the "1" codeword represents a white character module. To generate the standard QR code symbol with the user definable data 30, a "000" code symbol is chosen and embedded into the standard position detection pattern identical with the position detection pattern 12 in FIG. 1. In FIG. 5, the first QR code symbol 50 includes first position detection patterns 52, 54 and 56, and an information area 58. The first position detection patterns 52, 54 and 56 are generated by embedding the character modules 42, 44 and 46 into the standard position detection pattern, respectively. In addition, the character modules 42, 44 and 46 are adjusted in size to conform the data coding specification 18004. That is, the character modules 42, 44 and 46 have the same size as the character modules in the information area 58. The detailed description of the information area 58 is omitted here since the information area 58 is not related to the scope of the present invention.

Assume that the data content of the information area 58 is "Hello Everybody" in traditional Chinese and encoded based on the UTF-8 format. From the first position detection patterns 52, 54 and 56, the interpreting device determines that the encoding format is the UTF-8 format in advance. The information area 58 is then decoded based on the UTF-8 format and the "Hello Everybody" data content can be correctly decoded.

Please note that the preamble pattern 40 could be a black-and-white or grayscale pattern. In other words, the character modules 42, 44 and 46 could also be grayscale colors, which have a larger information capacity than black and white colors. In addition, the preamble pattern 40 can generate more than one character module for each first position detection pattern and the character modules can be arranged with specific combination patterns.

The sizes of the character module and the first QR code are chosen dependent on a camera sensing resolution. For a camera with 1-1.3 megapixels, the versions 1-30 (21×21-137×137 modules) can be used for the first QR code 50, and the versions 1-15 can be used for character module size. For a camera with 1.3 megapixels and more, the versions 1-50 (21×21-217×217 modules) can be used for the first QR code 50, and the versions 1-30 can be used for character module size. For a camera with lower than 1 megapixels, the character modules 42, 44 and 46 are interpreted as spots or light reflections due to the poor sensing resolution. In this situation, the first QR code 50 is considered the standard QR code symbol. Thus, the first QR code 50 is also readable and compatible with original systems.

Figure 6:
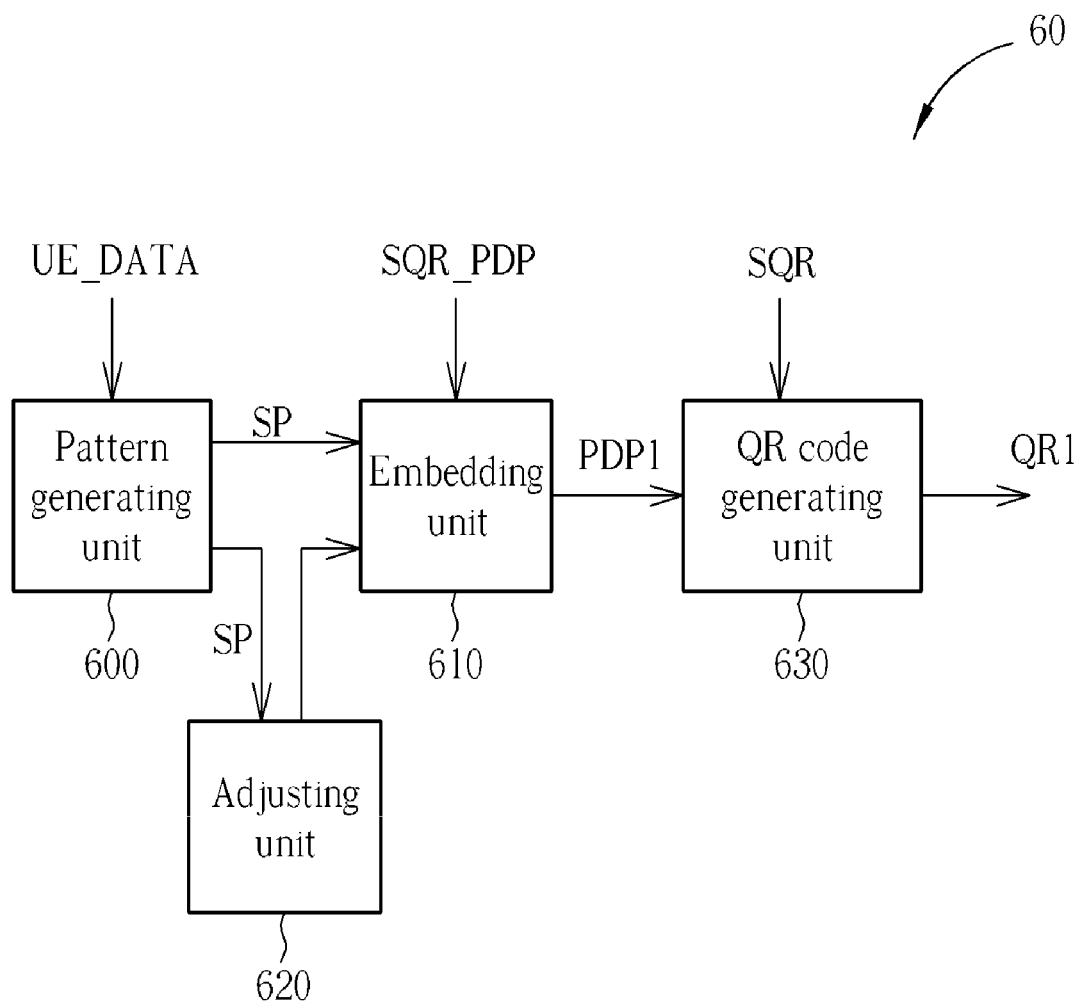
FIG. 6 is a generating device according to an embodiment of the present invention.

Please refer to FIG. 6, which is a generating device 60 according to an embodiment of the present invention. The generating device 60 is utilized to realize the preamble generating process 200 and thereby embeds preamble information into a standard QR code symbol SQR to generate a first QR code symbol QR1. The generating device 60 includes a pattern generating unit 600, a embedding unit 610, a adjusting unit 620 and a QR code generating unit 630. The pattern generating unit 600 generates a preamble pattern SP according to a user definable data UE_DATA. The embedding unit 610 embeds the preamble pattern SP into a standard position detection pattern SQR_PDP of the standard QR code symbol SQR to generate a first position detection pattern PDP1. The adjusting unit 620 adjusts the size or color of the preamble pattern SP. The QR code generating unit 630 generates the first QR code symbol QR1 according to the first position detection pattern PDP1. The detailed operations of the generating device 60 can be referred by the preamble generating process 200 and are thus omitted herein.

In conclusion, the embodiment of the present invention embeds a pattern into the position detection pattern of the standard QR code symbol and thereby the position detection pattern is allowed including more preamble information. Therefore, the present invention eliminates the decoding inconvenience.

Those skilled in the art will readily observe that numerous modifications and alterations of the device and method may be made while retaining the teachings of the invention.

What is claimed is:

1. A method of embedding preamble information into a standard quick response (QR) code symbol, the method comprising:
   generating a preamble pattern according to a user definable data; and
   generating a first QR code symbol by replacing a standard position detection pattern of the standard QR code symbol with a position detection pattern including the preamble pattern, for enhancing decoding accuracy of a receiver when decoding the first QR code symbol.

2. The method of claim 1 further comprising adjusting the preamble pattern based on a data coding specification 18004 developed by International Organization for Standardization (ISO) and International Electrotechnical Commission (IEC).

3. The method of claim 1, wherein the user definable data comprises country information corresponding to the first QR code symbol.

4. The method of claim 1, wherein the user definable data comprises character encoding information corresponding to the first QR code symbol.

5. The method of claim 1, wherein the user definable data comprises company information corresponding to the first QR code symbol.

6. The method of claim 1, wherein the user definable data is stored in a look-up table.

7. The method of claim 1, wherein the preamble pattern is a pattern with black and white colors.

8. The method of claim 1, wherein the preamble pattern is a pattern with grayscale colors.

9. A device for embedding preamble information into a standard quick response (QR) code symbol, the device comprising:
   a pattern generating unit for generating a preamble pattern according to a user definable data; and
   an embedding unit coupled to the pattern generating unit, for generating a first QR code symbol by replacing a standard position detection pattern of the standard QR code symbol with a position detection pattern including the preamble pattern, for enhancing decoding accuracy of a receiver when decoding the first QR code symbol.

10. The device of claim 9 further comprising a adjusting unit coupled to the pattern generating unit, for adjusting the preamble pattern based on a data coding specification 18004 developed by International Organization for Standardization (ISO) and International Electrotechnical Commission (IEC).

11. The device of claim 9, wherein the user definable data comprises country information corresponding to the first QR code symbol.

12. The device of claim 9, wherein the user definable data comprises character encoding information corresponding to the first QR code symbol.

13. The device of claim 9, wherein the user definable data comprises company information corresponding to the first QR code symbol.

14. The device of claim 9, wherein the user definable data is stored in a look-up table.

15. The device of claim 9, wherein the preamble pattern is a pattern with black and white colors.

16. The device of claim 9, wherein the preamble pattern is a pattern with grayscale colors.

* * * * *